June 5, 1945.  A. G. WEYGERS  2,377,835
DISCOPTER
Filed Jan. 1, 1944  9 Sheets-Sheet 1

Inventor:
Alexander G. Weygers
By: Nicholas Pippen

June 5, 1945.  A. G. WEYGERS  2,377,835
DISCOPTER
Filed Jan. 1, 1944  9 Sheets-Sheet 2

Inventor:
Alexander G. Weygers
By: Nicholas Pipper

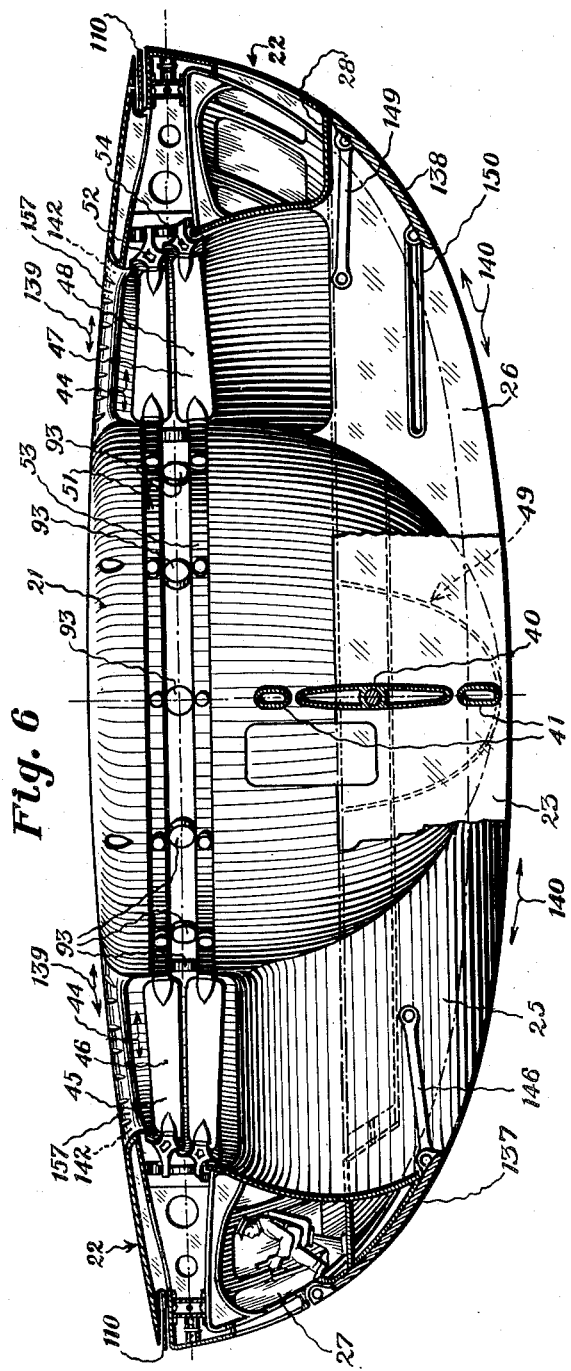
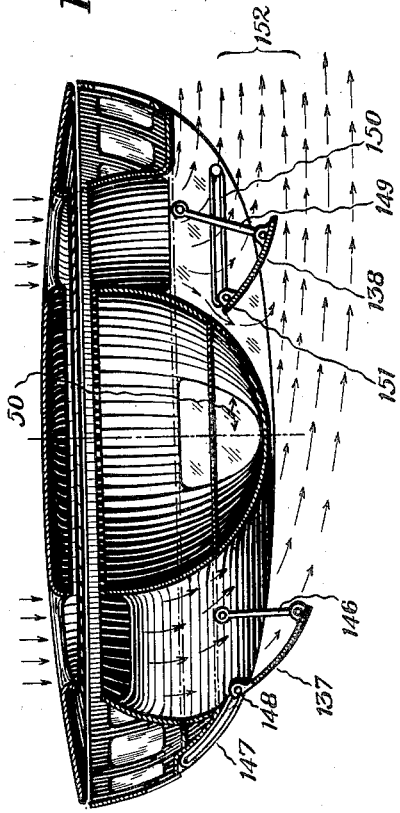

June 5, 1945.   A. G. WEYGERS   2,377,835
DISCOPTER
Filed Jan. 1, 1944   9 Sheets-Sheet 4
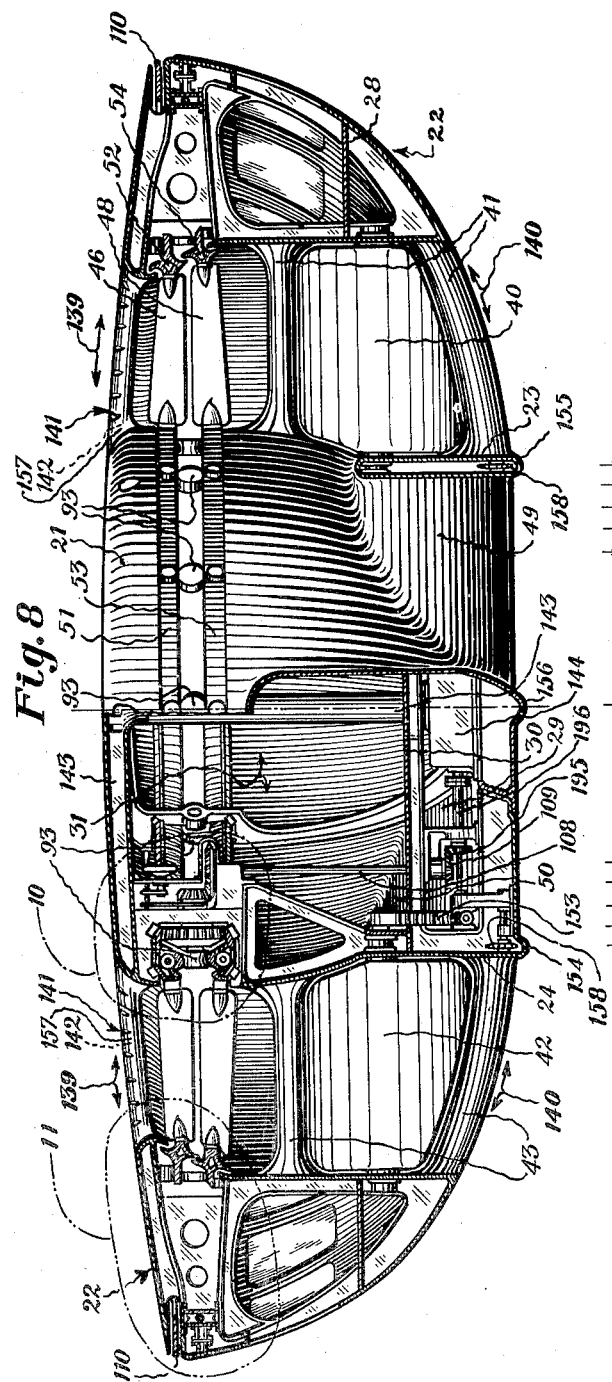
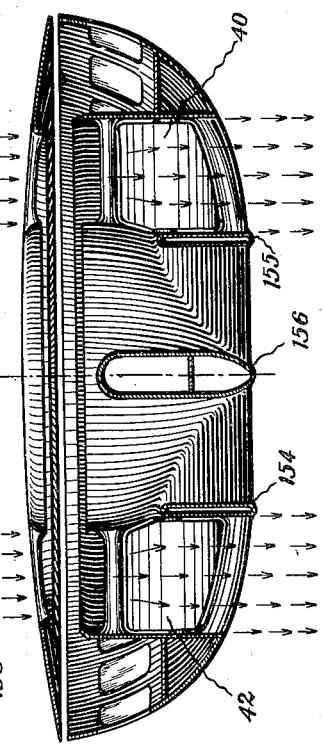
Inventor:
Alexander G. Weygers
By: Nicholas Pippa

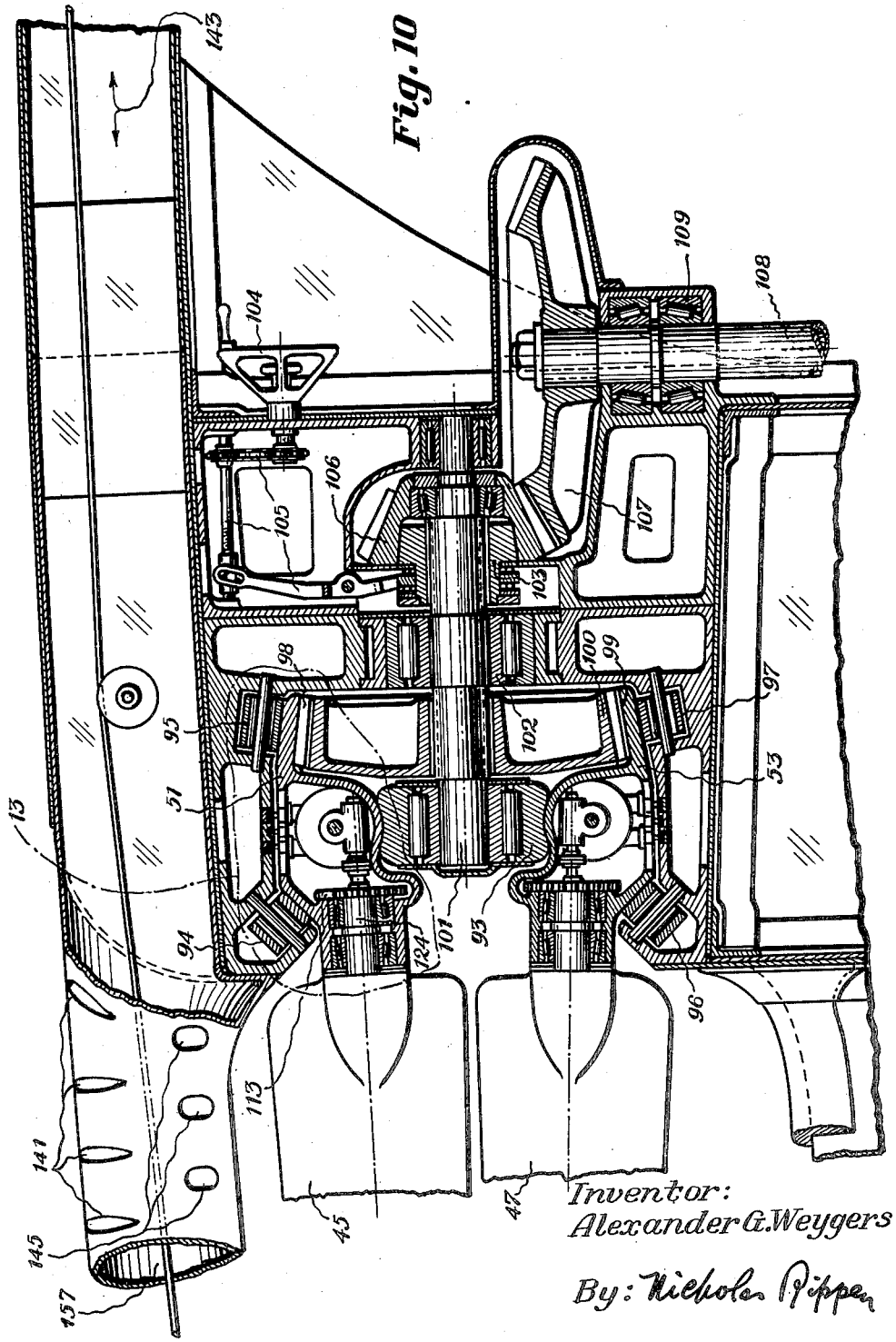

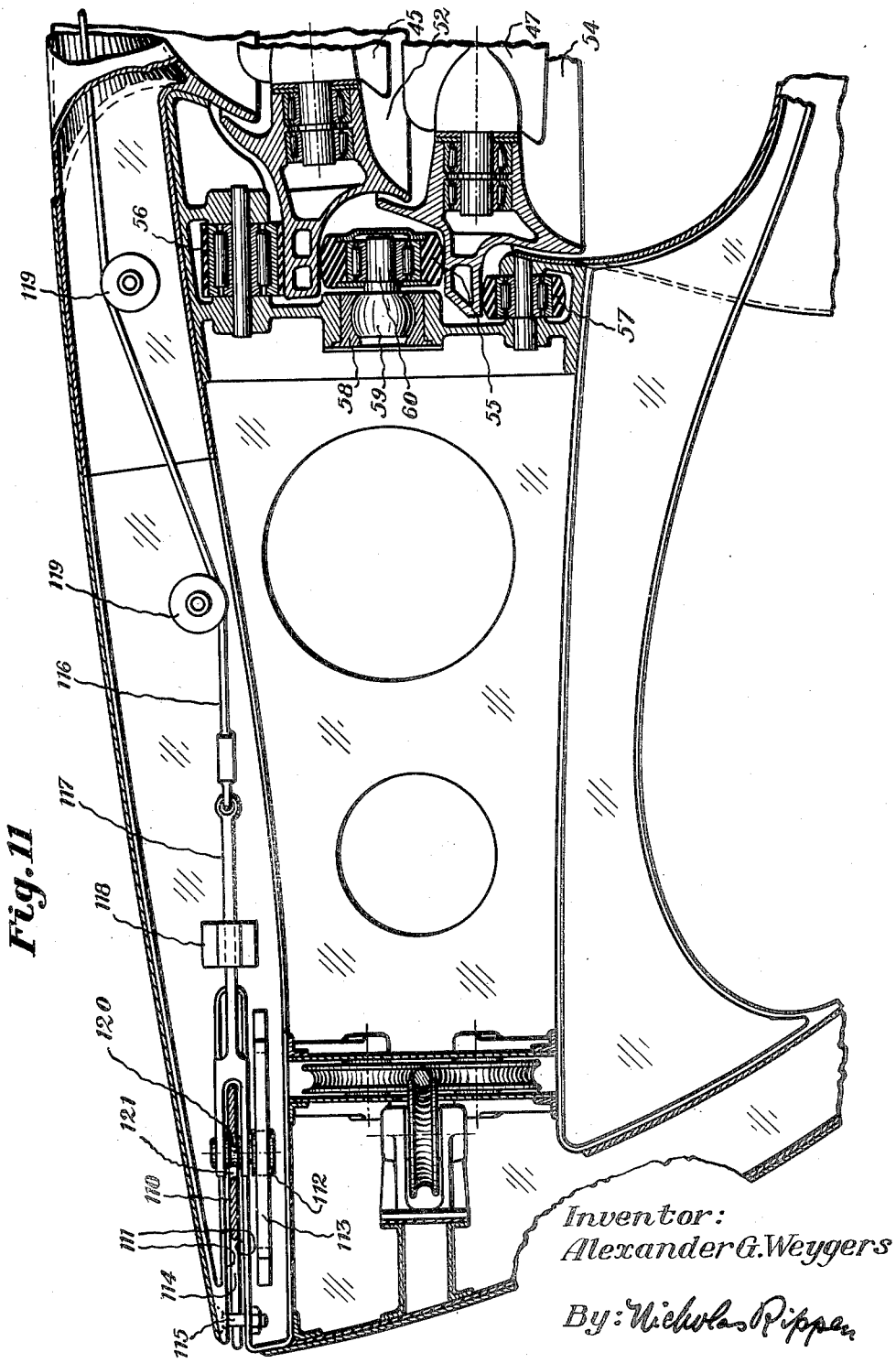

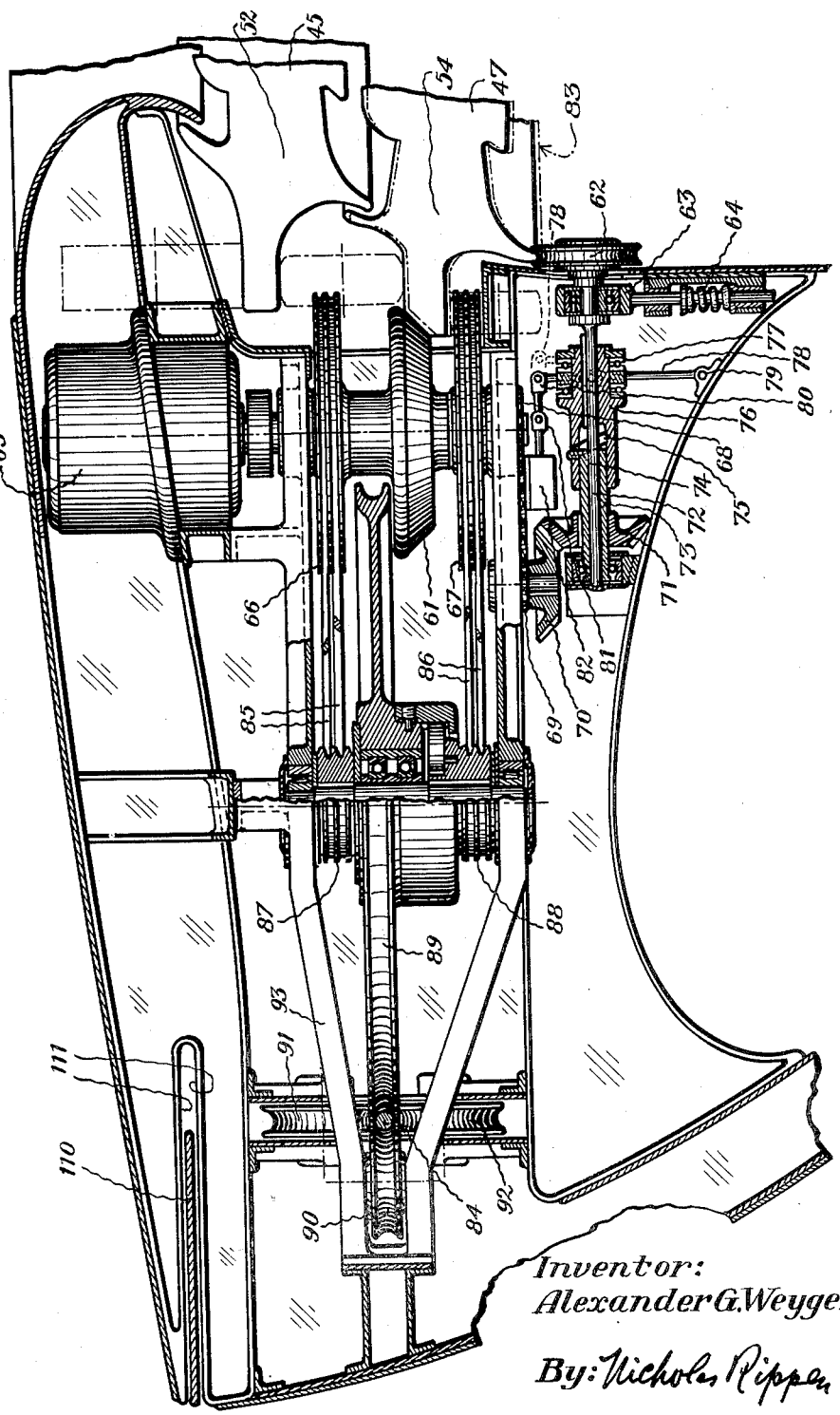

June 5, 1945.  A. G. WEYGERS  2,377,835
DISCOPTER
Filed Jan. 1, 1944  9 Sheets-Sheet 8
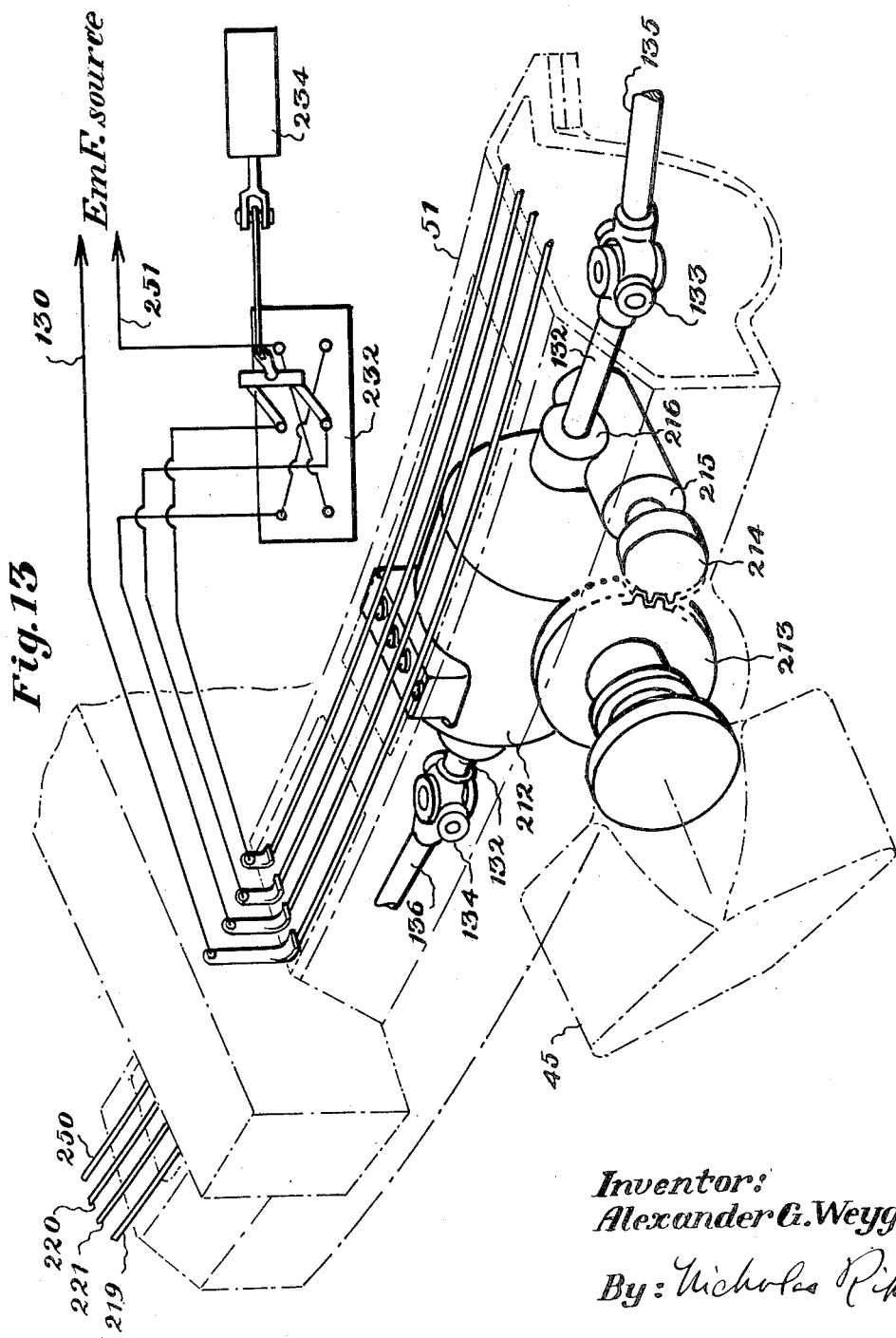
Inventor:
Alexander G. Weygers
By: Nicholas Ripken June 5, 1945.  A. G. WEYGERS  2,377,835
DISCOPTER
Filed Jan. 1, 1944  9 Sheets-Sheet 9
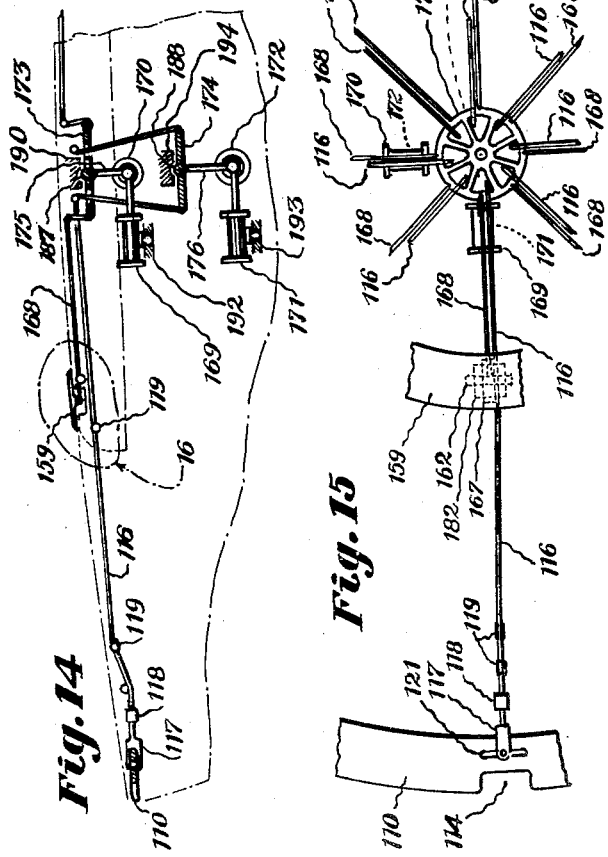
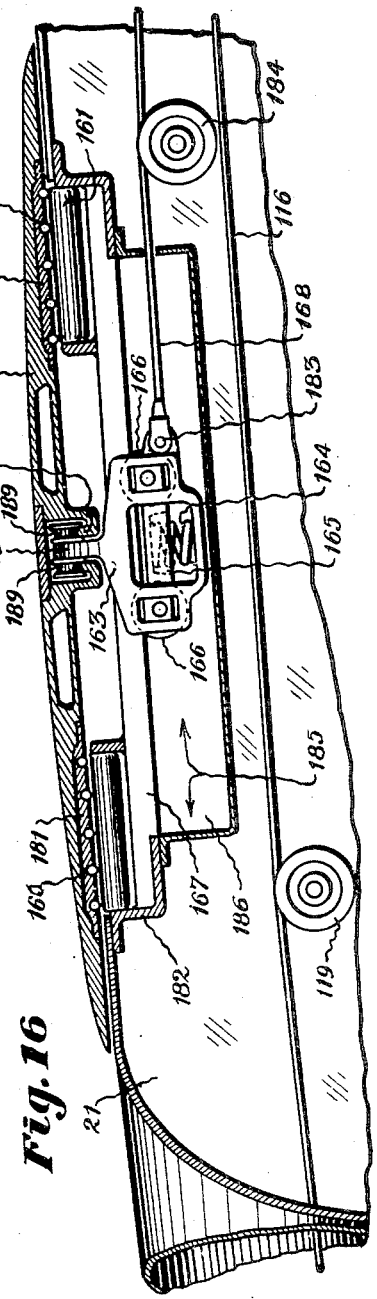
Inventor:
Alexander G. Weygers
By:
Nicholas Rippen Patented June 5, 1945

2,377,835

UNITED STATES PATENT OFFICE 2,377,835

DISCOPTER

Alexander George Weygers, Oakland, Calif.

Application January 1, 1944, Serial No. 516,689

4 Claims. (Cl. 244—23)

My invention relates to wingless, heavier-than-air flying craft, whose outstanding example, until the time of the instant invention, has been the helicopter.

To a helicopter, a craft constructed on the principles of my invention bears a superficial resemblance, in that both types are sustained by at least one horizontal rotor. From this point on, however, all similarity between the two types of flying craft ends. A craft embodying my invention is distinguished from a helicopter in that the rotor or rotors in my craft are enclosed within a substantially vertical tunnel, the rotor regarded as a whole is mainshaftless and the external form of the craft is not very different from the familiar discus of the athlete, in common with which the craft enjoys certain aerodynamic advantages characteristic of the passage of the discus thru the air. Not only the rotors and power plant compartments but all of the usual moving and fixed protruding parts, present in both airplanes and helicopters, such as stabilizing and directing means and otherwise, are entirely enclosed within the strikingly simple and cleanly streamlined contour line of the craft when regarded from exteriorly thereof in any elevation view, thereby concealing from the casual view such parts.

The above mentioned three salient characteristics distinguishing my craft from the helicopter, set the two types apart by an extent at least as great as the difference between the helicopter and the airplane. Because of this basically new approach to the problem of designing superior flying craft, there is thereby posed a gap in generic terminology that can be filled only incompletely and awkwardly by qualifying the word, helicopter. To fill this gap, I have been compelled to coin a noun, a short, tri-syllabic term, for use now and in the future by myself and others in connection with all craft, whether designed by myself or others on the herein expounded principles, a term that connotes both the external form of the craft and its functional relationship to the helicopter. This term, selected for the title of this specification, is—discopter.

Craft embodying my invention may be sustained and propelled by a single rotor, a pair of coaxial rotors, a plurality of non-coaxial rotors, a plurality of non-coaxial pairs of coaxial rotors, or any other combination of the foregoing. For expounding said principles in a readily intelligible manner and also because it is a recommended type, particularly in the case of small craft, I have selected the type having a single pair of coaxial rotors revolving oppositely for description in this specification and for illustration in the accompanying drawings, in which—

Figure 6 is an enlarged, sectional view thereof, taken in the plane 6—6 in Figure 1 and as the discopter appears when in non-translational flight.

Figure 7 is a schematic sectional view thereof, taken in the plane 7—7 in Figure 1, to show the disposition of certain valves and air-currents when the discopter is in translational flight.

Figure 8 is an enlarged sectional view thereof, taken in the plane 8—8 in Figure 1.

Figure 9 is a schematic sectional view thereof, taken in the plane 9—9 in Figure 1, showing the disposition of certain valves and air-currents when the craft is in non-translational flight.

Figure 10 is an enlarged sectional view of certain parts within the circumscribed area 10 in Figure 8.

Figure 11 is an enlarged sectional view of certain parts within the circumscribed area 11 in Figure 8.

Figure 12 is an enlarged partly sectional view of certain parts within the circumscribed area 12 in Figure 1, adjacent the roof of the craft.

Figure 13 is an enlarged view of certain parts within the circumscribed area 13 in Figure 10.

Figure 14 is a schematic elevation view of certain parts adjacent the roofs of the two main bodies that are characteristic of the discopter, but embodying an optional, additional equilibrium-controlling means.

Figure 15 is a schematic plan view of the same.

Figure 16 is an enlarged sectional view of certain parts within the circumscribed area 16 in Figure 14.

Figure 17 is a schematic elevation view of a certain hub body in the craft, showing the disposition of certain rocket-type sustaining means.

Figure 1:
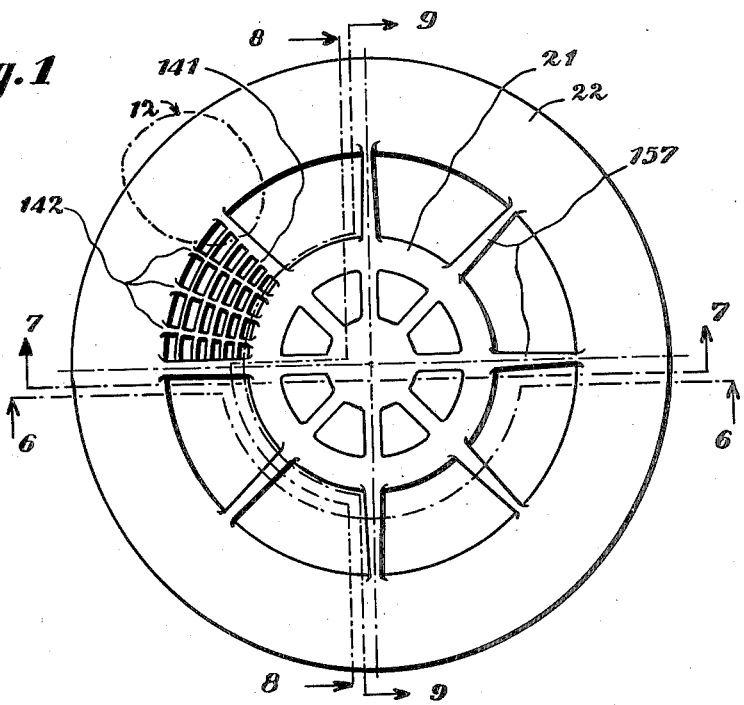
Figure 1 is a plan view of said type as seen from above, the rotors having been removed from the view.
Figure 2:
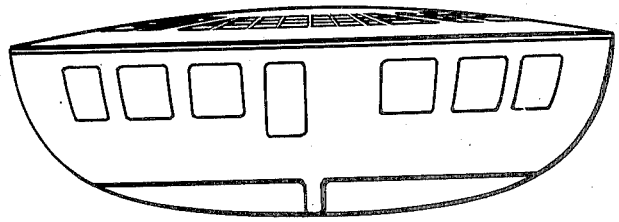
Figure 2 is a side elevation view thereof.
Figure 4:
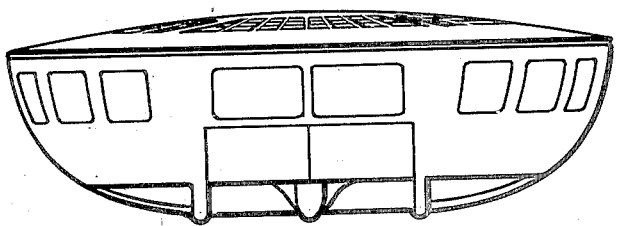
Figure 4 is a fore or bow end elevation view thereof.
Figure 3:
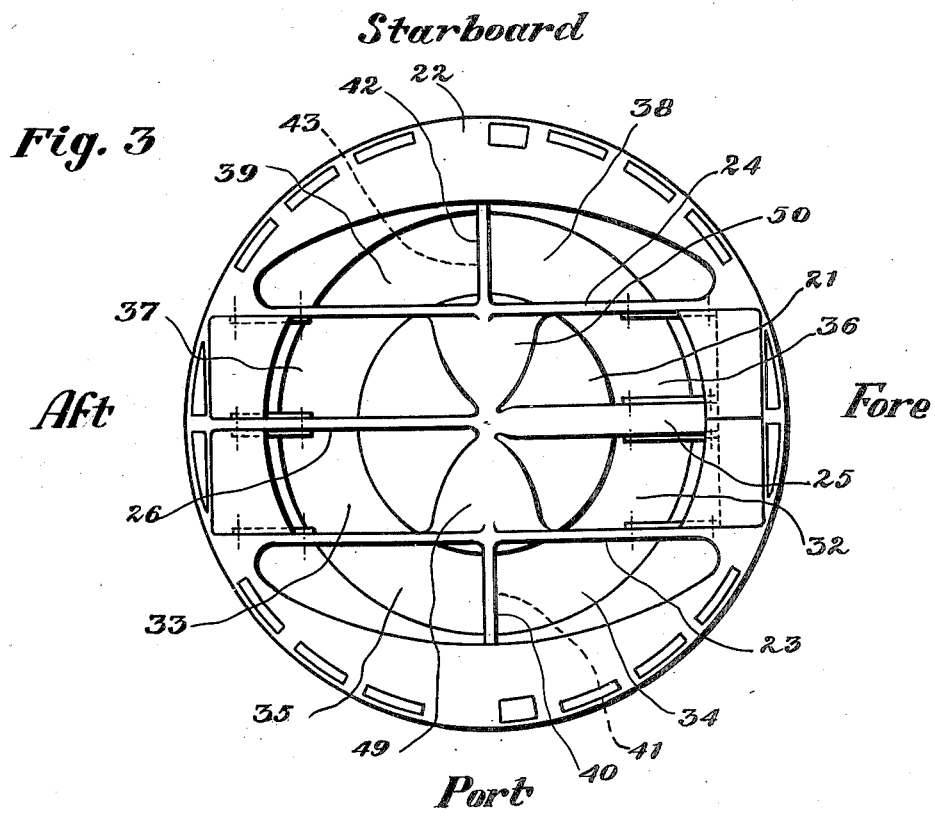
Figure 3 is a plan view thereof as seen from below, the rotors having been removed from the view.
Figure 5:
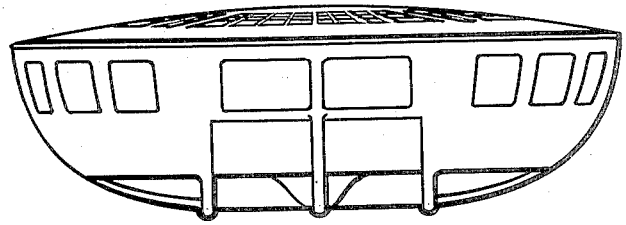
Figure 5 is an aft or stern end elevation view thereof.

Refer to Figures 3, 6 and 8. The main structure of the discopter consists of two mutually rigidly secured main bodies, one, a hub body 21, the other, a marginal body 22, disposed around, spaced from and secured to said hub body by a plurality of strength members therebetween, the space between the two bodies being a slipstream tunnel of composite form. Two of these strength members consist of narrow, deep, longitudinally extending, skin-covered hollow frames, laterally flanking said hub body, referred to herein also as keelsons; they are port keelson 23 and starboard keelson 24. A third of the strength members is also a deep, longitudinally extending, skin-covered hollow frame, but it is wide enough to constitute therewithin a passageway for persons moving between the two main bodies. This member, also referred to as the vestibule, is indicated by 25. A fourth of said strength members is, like members 23 and 24, a narrow, deep, skin-covered frame, extending also longitudinally but, in this case, symmetrically or centrally of the craft at the aft or stern end thereof. It is indicated by 26 and is referred to as the aft keel. All skin-covered parts of the craft are provided with water-tight junctures so as to adapt the craft for floating on water as well as resting on land.

Marginal body 22, by virtue of its outside disposition and its form lends itself unusually well to the provision in its outer wall of windows for maximum vision from inside of the craft. Also, it is commodious enough to provide a pilot's compartment 27—see Figure 6—and a promenade deck all around the craft, whose floor is indicated by 28 and is referred to as the marginal floor. Hub body 21 contains main cabin 31 over engine compartment 29 under hub floor 30.

The aforesaid strength members, together with other parts of the structure that are adjacent to them and in therewith common horizontal planes, such as wall sections of said main bodies and certain beam valves and their frames, to be referred to again below, define eight lower tunnel sections that are mutually separated sections of the previously referred to slipstream tunnel of composite form. The remainder of this tunnel consists of an upper, annular section, in which the two rotors revolve; refer also to Figures 7 and 9. Said eight lower tunnel sections are: fore inner port section 32, contributively defined by vestibule 25 and port keelson 23; aft inner port section 33, contributively defined by keel 26 and port keelson 23; fore outer port section 34, contributively defined by the fore half section of port keelson 23, port valve 40 and respective valve frame 41; aft outer port section 35, contributively defined by the aft half section of port keelson 23, port valve 40 and respective valve frame 41; fore inner starboard section 36, contributively defined by vestibule 25 and starboard keelson 24; aft inner starboard section 37, contributively defined by keel 26 and starboard keelson 24; fore outer starboard section 38, contributively defined by the fore half section of starboard keelson 24, starboard valve 42 and respective valve frame 43; aft outer starboard section 39, contributively defined by the aft half section of starboard keelson 24, starboard valve 42 and respective valve frame 43.

Refer to Figures 3, 6, 7, 8 and 9. The previously referred to upper or annular section is indicated by 44. Accommodated by it and revolving therewithin are the upper rotor blades 45 of upper rotor 46 and the lower rotor blades 47 of lower rotor 48, said rotors revolving in opposite directions. Main hub body 21 is thereof laterally flanked by two compartments or lobes extending from the interior thereof at the lower part thereof. They are port lobe 49 and starboard lobe 50. These two lobes are disposed in loci where, in their absence, more or less eddying of air currents could be expected and therefore currents of little value. It is therefore thought advisable to constitute these lobes and thereby augment the total of utilizable space. Although adapted to house a variety of things, the two lobes herein contain mechanisms for actuating said valves.

Refer to Figures 6, 8, 10, 11, 12 and 13. Upper rotor 46 includes upper inner blade-mounting rotor ring 51 and upper outer blade-mounting rotor ring 52. Lower rotor 48 includes lower inner blade-mounting rotor ring 53 and lower outer blade-mounting rotor ring 54. The four rings are hollowed out for lightness, accessibility to bearing assemblies and to accommodate variable pitch-control mechanisms. Referring especially to Figure 11, supporting said outer rotor rings is a plurality of therebetween intervening rubber-tired thrust rollers 55, suitably spaced from one another along the inner marginal edge of marginal main body 22. Supporting the rotor rings 52 and 54 on those sides thereof that are opposed to the roller-55-adjacent sides thereof, is a plurality of rubber-tired thrust-bearing rollers 56 above and a like plurality 57 below, all suitably spaced from one another along the inner marginal edge of body 22. Obliquely displaceable radial bearings 58 journal the "ball" ends 59 of pins 60 mounting rollers 55.

Referring to Figure 12, lower outer rotor ring 54 is mounted in a manner whereby, when the rotor is at rest or revolving at idling speed, it is out of engagement with frictionally driven pulley 61, but it is always in engagement with throw-out-shaft pulley 62, whose shaft is journalled in bearings 63, resiliently mounted in association with compression spring 64 in a manner whereby pulley 62 is continuously pushed upwardly toward rotor ring 54. The shaft of electric motor 65 is disposed inside of a hollow shaft that mounts driven pulley 61 and the driving pulleys 66 and 67 and engages said hollow shaft thru a main pawl, said motor shaft having a sprocket 68 keyed to its end and engaging pawl sprocket 69 keyed to a common shaft with miter gear 70, in turn driving miter gear 71, keyed to hub 73, which hub journals shaft 72, the same shaft that pulley 62 is keyed to. Hub 73 is provided with pin 74 engaging helical lead 75 of sleeve 76, which in turn mounts, thru ball thrust bearing 77, the lever 78, pivoted at one end thereof by pin 79 and at the other end thereof by pin 80. Lever 78 is adapted to push and pull switch lever 81 of switch 82, which controls the starting and stopping of electric motor 65. The disposition of parts shown in Figure 12 is the one obtaining when the switch is off, the electric motor not turning, the driven pulley 61 being driven by rotor ring 54 because the latter is now revolving at full operating speed from the solid-line position it is now in and into which it has been pushed from the previous at-rest or idling position indicated by dot-and-dash lines 83, expressing the upward reaction imposed on it by the air it is now displacing downwardly. In this full operating state, the higher R. P. M. of pulley 62 "over-rides" the relatively low R. P. M. otherwise imposed on the throw-out hub 73, with the result that pin 74 causes sleeve 76 to move outwardly and carry with it switch lever 81 to be pushed correspondingly into the "off" position for motor 65. Since motor 65 has as its function only the moderately fast revolving of gyroscopic ring 84—to be referred to again below—when the rotors are revolving slowly or not at all, as when ending or beginning a flight, the motor 65 is designed to operate at a speed considerably less than the normal speed of the rotors, so that the aforesaid "over-riding" ensues. Pulley 62 has been provided with a pawl in similar manner as in pulley 89 in order that no slippage shall occur between rotor 54 and upward pressing pulley 62 when the rotor stands still or when its speed is less than the speed at which "over-riding" occurs.

Pulleys 66 and 67 drive, thru V-belts 85 and 86, the pulleys 87 and 88 respectively. Pulleys 87 and 88 are keyed to a shaft common to driving pulley 89, driving gyroscopic ring 84, which is supported by a plurality of sets of grooved-rimmed rollers, 90, 91 and 92, which sets are distributed at suitable intervals around marginal body along the outer margin thereof. One of said rollers, 90, and pulleys 89, 88, 87, 67, 66 and 61 are mounted in frame 122, which mounts also motor 65 and other neighboring parts.

The gyroscopic ring is a solid ring in one piece, although it may be constituted of a series of successively mutually secured segments as well. The ring is provided with mass and revolving speed adequate for its function of providing a considerable measure of gyroscopic stabilizing force on the craft.

Refer to Figures 6 and 8 and especially to 10. Said inner rotor rings are supported by a plurality of rollers 93 between the rings. Supporting the rotor rings 51 and 53 on those sides thereof that are opposed to the roller-93-adjacent sides thereof is the upper plurality of pairs of thrust rollers 94 and 95 and the lower plurality of pairs of thrust rollers 96 and 97, respectively, all of said pluralities being disposed at appropriate intervals around hub body 21 along the roof margin thereof.

Rotor rings 51 and 53 are provided also with mutually confronting, circular toothed racks, 98 and 99, respectively. Driving rotor rings 51 and 53 thru said racks is the bevel gear 100, which, together with one of said rollers 93, is keyed to shaft 101, journalled in bearing 102. Shaft 101 has, secured to the inner end thereof, the male cone clutch member 103, actuated by wheel 104 thru elements 105, member 103 engaging female cone clutch member 106 having a bevel-toothed periphery for coaction with bevel gear 107, keyed to counter shaft 108, journalled in bearing 109.

Referring to Figures 6, 8, 10 and 15 and especially to 11, the craft is provided with an outer stabilizing ring 110, also referred to as the secondary stabilizing ring, accommodated in slot 111. Ring 110 is displaceable eccentrically with reference to the vertical axis of the craft, in a horizontal direction that may be toward the bow, the stern, either beam, or obliquely. To reduce the otherwise perhaps excessive frictional relationship between the ring and its slot 111, the path of its movement is conditioned by a suitable plurality of rollers 112, secured to fork 117 and guided by guides 113, and a plurality of rollers 120, mounted on a roller pin mutual with rollers 112, and guided by slots 121 in ring 110; see especially Figure 15. Ring 110 is furthermore provided with notches 114, distributed along the outer margin thereof and freely accommodating the fixed pins 115, whose function it is to stiffen the otherwise insufficiently supported overhanging roof-margin of marginal body 22. Ring 110 is actuated by a plurality of cables 116 operating thru and attached to a corresponding plurality of forked rods 117, each journalled in a slide-bearing 118. Cables 116 are mounted on rollers 119. The function of ring 110 is a supplementary one for restoring equilibrium in response to manual operation or to an automatic pilot or to a combination thereof, supplementing the control exercised thru the structurally previously described valves, whose functioning will be described below. The integral nature of ring 110 makes it possible to displace it without resorting to push-and-pull controls. Only the one-way pulling control means in the form of cables 116, originating in a suitable control disc in the pilot's compartment is needed. Referring to Figure 8, countershaft 108 is driven, thru bevel gears 109 and 195, by shaft 196 of main power plant 144.

Referring to Figure 13, illustrating the mechanism for control of the pitch of the rotor blades, each blade shaft is geared to a thereto corresponding, individual, reversible electro servo motor 212 thru spur gears 213 and 214 and worm and pinion gears 215 and 216. Motor 212 is connected to the schematically represented electromotive force thru cables 130 and 251, the circuit thereof being completed by reversible switch 232. Switch 232 is closed or opened manually or it may be done automatically thru the medium of any one of a number of well known types of automatic pilots, schematically represented by 234, adapted to operatively respond to changes in altitude. Rails 221, 220, 219 and 250 are secured to rotor ring 51 in a manner whereby said rails are insulated from said ring.

Shaft 132 of motor 212 is connected, thru universal joints 133 and 134, to shafts 135 and 136, respectively, of the thereto flanking similar electric servo-motors, not shown, so that an acceptable degree of coordinated pitch-control of all of the rotor blades in rotor ring 51 can be attained. A similar arrangement obtains in the case of lower inner rotor ring 53. In view of the provision for an acceptable degree of coordinated pitch-control, only a single circuit, in the case of either inner rotor ring, from one of the blades to the indicating instrument is necessary.

Refer to Figures 1, 6, 7, 8 and 10. In addition to the previously referred to port and starboard valves, the craft is provided with a pair of fore or bow end valves 137, flanking vestibule 25 and functioning in lower tunnel sections 32 and 36, and a pair of aft or stern end valves 138, flanking keel 26 and functioning in lower tunnel sections 33 and 37.

The complete slipstream tunnel communicates with the exterior of the craft above by the substantially single roof opening or port 139, which may be regarded as only nominally subdivided into a plurality of ports by the grille elements, and below by the eight bottom ports 140. Roof port 139 is screened off above by a plurality of therewith coextensive, quadruple-function louver or grille panels, consisting of the hollow minor grille elements 141 and 142 and the therewith integral major grille elements 157. Elements 141 and 142 communicate interiorly thereof with one another and with major elements 157, which in turn communicate with exhaust pipe 143, extending upwardly from main power plant 144 for dissipation of the exhaust gases therefrom. Major grille elements 157 are provided with holes 145 communicating with the exterior of the craft by way of said roof port for egress therethru of said exhaust gases, as is the case with the said minor grille elements as well. It may be said that elements 141 and elements 142 and elements 157 each contributively constitute a muffler system for said main power plant, which is one of the four functions of the grille panels. A second function is the isolation of the interior of the slipstream tunnel from thereinto otherwise attracted foreign bodies, as, for example, birds. A third function is the heating of the air entering the slipstream tunnel, thereby reducing the tendency to iceformation on critical moving and other parts. A fourth function, one that is specific to said major grille elements, 157, is to constitute rigid connecting braces—parts of the previously referred to strength members—between the two main bodies at their respective roof levels. A fifth function is conceivable: by making the grille panels of the louver type illustrated in Figure 1, but with the louver "boards" adjustable instead of fixed, the "boards" can be actuated to selectively block a part or all of the thereto corresponding, therewith coextensive roof port or ports, whereby control over the equlibrium of the craft may be thereby effected in obvious manner.

Foreign objects, such as rain, hail, snow and otherwise, passing thru the grille panels, will, upon contacting the rotor blades, be hurled centrifugally therefrom. Since unattached objects within a rotating body, upon contacting the interior members of this body, gravitate toward those parts thereof having greatest speed, therefore, the parts of greatest diameter, it follows that the rim diameter dimensions of the overlapping outer rotor rings, which increase gradually as they approach the lower rim of the lower rotor ring, will determine the path of movement of said unattached foreign bodies entering the slipstream tunnel. Once said objects have been projected centrifugally and downwardly, passing the rotor rings, the force of the downwardly directed slipstream will tend to carry the objects with it, to be ejected thru the bottom ports.

Referring to Figures 14, 15 and 16, there is illustrated here the substantially flat, eccentrically displaceable, primary stabilizing ring 159, movably secured to and overlying the upper marginal section of hub body 21 and adapted to being eccentrically displaced away from the vertical axis of the craft in any indicated direction to partially choke a desired section of the slipstream tunnel and thereby effect control over the equilibrium of the craft in a degree exceeding that provided by the previously described secondary flat or outer stabilizing ring 110. Ring 159 is referred to also as the inner flat stabilizing ring and alternatively as the slipstream-choking ring.

Substantially square housings 186, constituted of frames 182 and sections 185 are disposed at suitable intervals along the margin of hub body 21. Each housing 186 is provided with a pair of rails 167 in radial position with hub body 21, dividing the circumferential sides of the housing into two equal parts. The rails 167 engage flanged wheels 166, mounted in subframes 165, in turn resiliently mounted, thru springs 164, in major wheel-frames 163. Major frames 163 are provided with yoke-extensions 180, mounting thereto flanking flanged wheels 189, engaging rails 162, integral with ring 159. Ring 159 is provided with bearing plates 181, mounting pluralities of rollers 160, axially transversely engaging major rollers 161, mounted on rails 167 and frame 182. By this device, ring 159 is retained snugly and yet nearly frictionlessly against the hub body. Each said major wheel-frame is provided with a lug, to which a cable 168 is secured by a pin 183. Cables 168 ride on rollers 184 and are centrally joined to a central disc 173, which in turn is actuated by hydraulic cylinders 169 and 170 thru arm 175, journalled in ball joint 187, in response to the pilot's manual controls or to an automatic pilot or to both. Similarly, the cables 116, operating ring 110, terminate centrally in disc 174, actuated thru arm 176, journalled in ball joint 188, by hydraulic cylinders 171 and 172. Both ball joints 187 and 188 are fixed relatively to hub body 21. The aforesaid describes an optional additional stabilizing control device for the craft.

Refer to Figures 6, 7, 8 and 9. The fore or bow end valves 137 and the aft or stern end valves 138 are shown retracted in Figure 6, when the craft is, if in the air, in a hovering state, with the bottom parts 140 entirely unobstructed and therefore permitting the descending air currents from the rotors to continue substantially straight downwardly, providing only sustaining force for the craft.

In Figure 7, the bow end valves 137, under the action of slidable pins 148 secured to valves 137 and valve arms 146 and with the path of their movements conditioned by guides 147, have been displaced into a position wherein their inner surfaces constitute substantially well faired, aftwardly directed continuing surfaces of the fore surfaces of lower tunnel sections 32 and 36—see also Figure 3.

Similarly, in the case of stern end valves 138, under the action of slidable pins 151 secured to valves 138 and valve arms 149 and with the path of their movement conditioned by guides 150, these two valves have been displaced into positions wherein their inner curved surfaces extend aftwardly and downwardly. Obviously, the said disposition of said bow and stern end valves in Figure 7 operates to deflect the otherwise straight-downwardly directed slipstream 152 from the rotors into an aftwardly downward direction, thereby generating a propelling force on the craft in addition to a sustaining force thereon.

Refer to Figures 6, 7, 8 and 9. Port valve 40 and starboard valve 42, also referred to collectively as the beam valves, are shown in nondeflecting attitude for maximum utilization of the sustaining force generated by the descending currents thru lower tunnel sections 34, 35, 38 and 39. See also Figure 3. To correct yawing or to steer the craft, valves 40 and 42 may be suitably actuated. For example, assuming the pilot's desire to steer to the portside, the port valve can be pivoted to make it deflect the thereto corresponding currents slightly forwardly and the starboard valve pivoted to deflect the thereto corresponding currents aftwardly. Steering to the portside can be effected also by operating the portside valve alone, using it to deflect the thereto corresponding currents slightly forwardly, thereby braking the portside and without actuating the starboard valve at all, provided the center of rotation of the port and starboard valves intersects the ship's center of gravity.

In the event of a discopter type having a single rotor being used, the torque induced by the single rotor can be corrected automatically by actuating the beam valves with any one of a number of available automatic control devices. In the event of failure of either or both beam valves, the bow or stern end valves can be differentially actuated to set up yaw-correcting forces or to steer the craft or to restore equilibrium. All of the valves can be adapted to independent operation or to operation in any desired combination, under the control of the pilot or under automatic-pilot control or a combination thereof, utilizing devices that have long been familiar to the art. Since no claim is advanced respecting novelty of the actuating devices per se for said valves, because they do not constitute inventive parts of the instant invention, and to refrain from burdening this specification and accompanying drawings, no attempt is made to describe or illustrate them, excepting for a fragmentary illustration of some of the gearing actuating the starboard valve, indicated by 153 in Figure 8 and the gearing 158 actuating the fore and aft said valves.

Refer to Figure 17. In the event of breakdown of main power plant and to prevent a crash landing, the expedient of rocket sustentation is shown here being resorted to. This figure is a schematic view of the hub body provided with a series of circumferentially distributed jets 177 in the outer wall of the hub body and in the annular section of the slipstream tunnel. The jets are disposed in a manner whereby the discharge therefrom distributes as evenly as possible an annular blast filling the slipstream tunnel with a substantially balanced, downwardly directed slipstream, the power for the discharge deriving from explosive dry or liquid material of any suitable type. Suitable devices can be employed for selective use of the jets individually or for selectively determined use of their collective discharges to effect a downwardly directed force that is only slightly less than the force of gravity acting on the craft, whereby the craft can be eased down gently.

Refer to Figures 8 and 9. The craft has been shown without landing gears other than the moderately protruding bottom edges of the keel, keelsons and vestibule, which, in the case of the keelsons and vestibule, are indicated by 154, 155 and 156 respectively. These protruding edges can be utilized for landing or resting on. The keelsons are adapted to being fitted with therein-contained retractable wheel-type landing gear or even caterpillar-type gear to facilitate the work of moving the craft about on the ground without resorting to the main power plant and rotors. This is particularly applicable to use of the craft amphibiously or for rising from and settling on water alone. Because the hull is readily adaptable to watertight construction thereof, because of the extreme flanking position of the keelsons' protruding bottom edges and because of the craft's substantially circular form, a capsizing of it in even a very heavy sea is unthinkable. The aftwardly flowing air-currents, a part of which are above the waterline, when suitably varied differentially by actuation of the two stern end valves, combined with reversed rotor-blade pitch, provides the craft with satisfactory self-docking quality and with the ability to execute other necessary movements while on the surface of the water.

In the event of a craft embodying a plurality of non-coaxial rotors, the term, marginal body, will be understood as applying to a composite structure of a plurality of hub bodies and respective slipstream tunnels other than the particular hub body and respective slipstream tunnel that happen to be under consideration.

I claim:

1. A substantially wingless, heavier-than-air flying craft, referred to as a discopter, powered by at least one main power plant and at least in greater part sustained and propelled by at least one main shaftless rotor powered by said main power plant and adapted to generate an initially downward slipstream, the main structure of the discopter consisting of a marginal body and at least one hub body, said marginal body being disposed around, spaced from and secured to said hub body by a plurality of therebetween intervening strength members, said space being a slipstream tunnel of composite form and constituted, in the upper part thereof, of an annular main tunnel section adapted to accommodate therewithin the said rotor, and, in the lower part of said tunnel, of a plurality of lower tunnel sections at least contributively defined by at least some of said strength members and including at least one port beam, at least one starboard beam, at least one bow end and at least one stern end lower tunnel section, the discopter including a plurality of quickly operable slipstream-controlling means respectively disposed in a corresponding number of said lower tunnel sections, said tunnel communicating with the exterior of the discopter, substantially at the roof thereof, by at least one roof port corresponding to said annular tunnel section, and, at the bottom of the discopter, by a plurality of bottom ports respectively corresponding to said lower tunnel sections.

2. A discopter as set forth in claim 1, at least one of said strength members being hollow and commodious enough to constitute itself into a passageway for persons between said two main bodies.

3. A discopter as set forth in claim 1, said strength members including a plurality of hollow braces between said two main bodies at their respective roof levels and adapted to function as part of a muffler system for the dissipation of the exhaust gases from said main power plant.

4. A discopter as set forth in claim 1 and including at least one grille panel disposed at said roof port, said panel being constituted, at least in appreciable part, of hollow members that are adapted to function as part of a muffler system for the dissipation of the exhaust gases from said main power plant, a part of said hollow members being relatively large and adapted to function as braces between said two main bodies at their respective roof levels.

ALEXANDER GEORGE WEYGERS.